Patented Dec. 18, 1951

2,579,331

UNITED STATES PATENT OFFICE 2,579,331

COMPOSITIONS CONTAINING METHYLOL PHENYL ETHERS

Robert W. Martin, Lenox, Mass., assignor to General Electric Company, a corporation of New York No Drawing. Application January 4, 1951, Serial No. 204,465

16 Claims. (Cl. 260—33.2)

This application is a continuation-in-part of my earlier filed application, Serial No. 122,128, filed October 18, 1949, and assigned to the same assignee as the present invention.

This invention relates to compositions of matter comprising (1) a resinous composition selected from the class consisting of polyvinyl alcohol and polyvinyl acetal resins, and (2) a methylol phenyl ether corresponding to the general formula

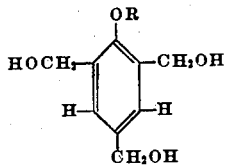

where R represents a member of the class consisting of aliphatic, cycloaliphatic, and aryl-substituted aliphatic groups including their halogen-substituted derivatives. The invention also includes mixtures of the above-identified methylol phenyl ethers with the above-identified class of resins wherein the trimethylol phenyl ether is in admixture with other chemical compounds of a similar nature but corresponding to the general formula

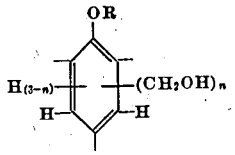

where R has the meaning given above and $n$ is an integar equal to from 1 to 2, inclusive.

Among the organic groups which R in the above formula may represent are, for instance, alkyl groups, e. g., methyl, ethyl, propyl, isopropyl, butyl, etc.; unsaturated aliphatic, e. g., vinyl, allyl, methallyl, cyclopentenyl, cyclohexenyl, etc.; cyclohexanyl, cyclopentanyl, etc.; aralkyl, for instance benzyl, etc.; styryl, etc.; as well as halogenated derivatives of the aforementioned aliphatic groups, for example, the aforementioned groups containing chlorine, bromine, fluorine, etc., either on the aliphatic or aromatic grouping and either monohalogenated or polyhalogenated, for example, containing from two or more halogens, for example, chlorines, in the organic group.

The methylol phenyl ethers may be prepared by a variety of methods. Thus they may be prepared from compounds corresponding to the general formula

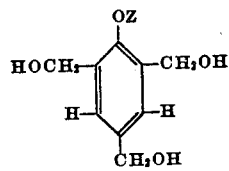

where Z is either a sodium or barium atom. Such methylol phenyl ethers are more particularly disclosed in my earlier filed application Serial No. 122,128. Thus, these ethers may be prepared by effecting reaction between either the sodium salt or barium salt of trimethylol phenol with the particular organic halide desired in order to replace the sodium or barium ion with the organic residue of the organic halide.

In order that those skilled in the art may better understand how the present invention may be practiced, the following examples are given by way of illustration and not by way of limitation. All parts are by weight. The sodium and barium salts of trimethylol phenol were prepared as follows.

Example I

To 188 parts (2 mols) phenol were added 90 parts (2.25 mols) sodium hydroxide which had been previously dissolved in seventy parts water. The mixture was cooled and allowed to crystallize; 588 parts (7.3 mols) formalin (37.2% by weight formaldehyde) were added and the mixture stirred. The temperature of the reaction mixture rose spontaneously to a maximum of 45° C. and then dropped slowly. The mixture was kept at room temperature fifteen to twenty hours, dehydrated under vacuum with heat until the temperature in the flask rose to 45° C. and poured into several times its volume of ethanol. After 3-4 hours the resultant precipitate of sodium trimethylol phenate was filtered and dried.

Theoretical yield—412 parts by weight
Actual yield—335 parts by weight or 81.3% of theory Formalin in the amount of 140 parts (1.73 mols), forty-seven parts (0.5 mol) phenol and forty-seven parts (0.55 equivalent) anhydrous barium hydroxide dissolved in seventy-five parts hot water were mixed in that order. The reaction mixture was kept at a temperature of 30° C. or lower for two hours. The mixture was allowed to react for twenty-four hours at room temperature. Ethanol in the amount of 1600 parts was added with vigorous mechanical stirring. The resulting precipitate of barium trimethylol phenate, after standing a few hours, was filtered off, washed with acetone and dried in a vacuum desiccator.

Theoretical yield—125.8 parts by weight
Actual yield—97.9 parts by weight or 77.8% of theory The identity of the above-prepared sodium salt was established by making derivatives thereof and determining the characteristics of the derivatives in accordance with the procedures outlined in my earlier filed application Serial No. 122,128.

It will be noted that the reaction for making the barium or sodium salts may be carried out at various temperatures, the lower temperatures ranging at around 0° C. requiring a reaction time of several days while the reaction at temperatures around 60° C. takes place in several hours. However, temperatures of over 65° C. will cause undesirable side reaction.

The sodium and barium 2,4,6-tris(hydroxymethyl)phenates described above are then reacted with other compounds to provide a class of primary polyhydric alcohols with a wide range of applications in the chemical, plastics and coating arts. More particularly such compounds are the ethers formed by the etherification of the phenolic hydroxyl groups. Such etherification considerably retards the tendency of the tris-(hydroxymethyl)-compound to resinify and hence makes it available for a number of other reactions and applications not possible with sodium tris(hydroxymethyl)phenol. For example, etherification of the phenolic hydroxyl group greatly improves the alkali resistance of resinous compositions containing them compared to the same compositions wherein the phenolic group has not been etherified.

The ethers prepared from the sodium and barium 2,4,6-tris(hydroxymethyl)phenates may be represented by the general formula:

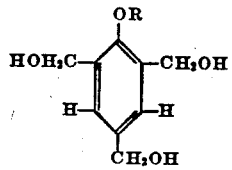

where R has the meaning given above. The following examples illustrate the preparation of various ethers coming within the scope of the above-identified general formula.

*Example II*

A mixture of 139 parts by weight of sodium 2,4,6-tris(hydroxymethyl)phenate, 126 parts by weight of methyl iodide and 440 parts by weight of methanol was divided equally between three bottles. The bottles were sealed and placed in an oven at 65° C. for about fifteen to twenty hours. The bottles were cooled and opened. The methanol was boiled off and the products were dissolved in amyl alcohol. The amyl alcohol solution was washed with an aqueous solution of sodium carbonate. The amyl alcohol was distilled off under vacuum. The product, 1-methoxy-2,4,6-tris(hydroxymethyl)benzene was a viscous light brown syrup.

Yield=118 parts by weight. Theory=134 parts by weight.
Methoxyl content=15.33%, 15.70%
Theory=15.66%

*Example III*

To twenty-one parts by weight of sodium 2,4,6-tris(hydroxymethyl)phenate placed in a bottle, eighty parts by weight of methanol and sixteen parts by volume of methyl iodide were added. The bottle was sealed and heated for six hours at 68° C. The reaction mixture was allowed to stand for two days at room temperature. The methanol was evaporated and the product esterified using acetic anhydride and pyridine as esterifying agent. The ester, 1-methoxy-2,4,6-tris-(acetoxymethyl)benzene, was distilled.

Saponification equivalent=107, 106.4
Theory=108
Carbon:
   Found=59.53%, 59.57%
   Theory=59.26%
Hydrogen:
   Found=5.96, 6.01
   Theory=6.22

*Example IV*

To 210 parts by weight of sodium 2,4,6-tris-(hydroxymethyl)phenate was added a solution of 130 parts by weight of allyl bromide in 475 parts by weight of methanol. The mixture was refluxed with stirring for two hours. The methanol was distilled off under vacuum and amyl alcohol added. The amyl alcohol solution was washed with a solution of saturated sodium carbonate-potassium chloride and was dried over anhydrous sodium sulphate. The amyl alcohol was removed under vacuum. The product, 1-allyloxy-2,4,6-tris(hydroxymethyl)benzene, was a brown syrup.

Yield=140 parts by weight. Theory=224.

*Example V*

Same as Example IV except that the mixture was heated for two and one-half to three hours at 45° C. and then at 60° C. for two hours. For a number of reaction of this example the conversion to the allyl ether was found to range from 90 per cent to 100 per cent.

*Example VI*

Forty-two parts by weight of the sodium 2,4,6-tris(hydroxymethyl)phenate was placed in a bottle with forty parts by volume of a 2.5 per cent solution of sodium hydroxide. 26.6 parts by weight of benzyl chloride was added as well as thirty-two parts by weight of methanol. The reaction ingredients were shaken at 55° C. for forty-eight hours. The cooled contents of the bottle were poured into 200–300 parts by weight of hot water, heated for ten to fifteen minutes and stirred. When stirring was stopped, the product separated out as an oily layer. The washed product was dissolved in acetone, filtered, and the water and acetone distilled off. The product, 1-benzyloxy-2,4,6-tris(hydroxymethyl)-benzene, was a brown syrup. The theoretical yield was 54.8 parts by weight, the actual yield was 38.92 parts by weight or a 71 per cent yield.

*Example VII*

Example VI was repeated using nineteen parts by weight of 2-methallyl chloride in place of the benzyl chloride. The methanol which had been added in Example VI to increase the solubility of the benzyl chloride in the reaction mixture was not employed. The product, 1-(2'-methallyloxy)-2,4,6-tris(hydroxymethyl)benzene, was a very viscous, almost solid brown syrup. The actual yield was 32.92 parts by weight as compared with the theoretical 47.6 parts by weight or a 69 per cent yield.

Example VIII

Example VI was again repeated using 23.3 parts by weight 2,3-dichloropropene-1 in lieu of the benzyl chloride. Methanol was not used. The product, 1-(2'-chloroallyloxy)-2,4,6-tris(hydroxymethyl)benzene was a viscous brown syrup. The yield of 44.52 parts by weight was 86 per cent of the theoretical value of 51.7 parts by weight.

Example IX

Example VI was repeated using 23.3 parts by weight of 1,3-dichloropropene-1 in place of benzyl chloride and without the use of methanol. The 1-(3'-chloroallyloxy)-2,4,6 - tris(hydroxymethyl)benzene was a viscous brown syrup. The yield was 40.82 parts by weight or 79 per cent of the theoretical value of 51.7 grams.

Example X

Example VI was repeated using 41.6 parts by weight of isoamyl iodide in place of benzyl chloride and with forty parts by weight of methanol. The produce yield was 9.19 parts by weight as against a theoretical 50.8 parts by weight or 18 per cent. The 1-isoamyloxy-2,4,6-tris(hydroxymethyl)benzene was obtained as a viscous brown syrup.

Example XI

Example VI was again repeated using 28.8 parts by weight of n-butyl bromide in place of the benzyl chloride along with forty parts by weight of methanol. The yield of 1-butyloxy-2,4,6-tris-(hydroxymethyl)benzene as a viscous brown syrup was 27.85 parts by weight or 57.8% of the theoretical value of forty-eight parts by weight.

Example XII

One hundred and ninety-two parts by weight of the sodium salt of trimethylol phenol was dissolved in water and 49 parts by weight of dimethyl sulphate added. The mixture was stirred for two hours, 71 parts by weight of sodium hydroxide and 92 parts by weight of dimethyl sulphate added and stirring continued for about 12 hours. The temperature of the mixture was then raised to boiling and extracted while hot with n-amyl alcohol. The product, trimethylol anisole, was obtained in a yield of 135 parts by weight, or a 73% of theory. All of the product was refluxed several hours with and excess of acetic anhydride. The acetic acid and excess acetic anhydride was removed by heating under vacuum. The resulting ester was washed twice with water and distilled at a temperature of 170-180° C. under a reduced pressure of 1-2 mm. of mercury to yield purified tri-(acetoxymethyl)anisole.

The ethers of trimethylol phenols have been found to be useful as plasticizers for various resins. Their use in conjunction with the various resins increases remarkably the resistance of the resins to alkalies, acids, soap solutions, solvents, and other corrosive chemicals. The weatherability and resistance to salt spray of such treated resins is also greatly enhanced.

These ethers find use in low shrinkage casting resins and in molding and potting compounds. They are useful also in laminating resins and in the production of films, varnishes, wire coatings. The low water absorption and repellent characteristics produced by the ethers make them useful in hot- and cold-setting glues. They have been found also to act as mild curing agents for various synthetic rubbers and also add tack to and ease the milling of such materials.

In order to effect rapid cure of the ethers of tri-(hydroxymethyl)phenol catalysts are usually added. Acids or acid engendering reagents have been found most satisfactory. Where the ether group is unsaturated, sulphur and rubber accelerators, as well as metallic driers, are effective. Of the acid type, phosphoric acid has been found most suitable, but other acids such as hydrochloric, maleic, oxalic, etc. can be used.

A particularly suitable class of catalysts are the ammonia or amine salts of sulphuric or sulphonic acids, e. g., ammonium salts of p-toluene sulfonic acid, p-phenol sulfonic acid, o-phenol sulfonic acid; the morpholine salts of p- and/or o-phenol sulphonic acid, of benzene sulfonic acid; ethyl hydrogen sulphate; the urea salt of ortho and/or para phenol sulfonic acid, of p-toluene sulfonic acid; the mono urea, morpholine and ethanolamine salts of sulphuric acid.

This class of catalysts has several advantages. They are readily soluble in the ethers of tris-(hydroxymethyl)phenol and varnishes prepared from such ethers. The acid nature of the catalyst is modified so that corrosion of metallic containers and premature gelation of varnishes during storage is greatly reduced. An entirely unexpected advantage derived from the use of this class of catalysts is gloss retention in pigmented films. For example, the addition of several per cent of phosphoric acid to a paint, based on the allyl ether of tri-(hydroxymethyl) phenol and pigmented with $TiO_2$, will cause the paint to lose its gloss when baked to effect cure. However, several per cent of salts such as those derived from morpholine or urea and p- and/or o-phenol sulfonic acid can be added to the paint without deteriorating the gloss of the cured paint. In many cases the gloss of the cured film is actually improved over that of an uncatalyzed film by the addition of the catalyst.

The methylol phenyl ethers described above may be used in conjunction with either polyvinyl alcohol or polyvinyl acetal resins, so designated generically. Among the polyvinyl acetal resins which I may use are those obtained, for example, by partial hydrolysis of polyvinyl acetate and subsequent reaction of the hydroxyl groups of the hydrolyzed product with various aldehydes. The aldehydes used may be, for example, formaldehyde (to give polyvinyl formals), acetaldehyde (to give polyvinyl acetals), butyraldehyde (to give polyvinyl butyrals), as well as other aldehydes.

The amount of methylol phenyl ether which may be used with the foregoing class of resins may be varied within wide limits without departing from the scope of the invention. On a weight basis, the amount of methylol phenyl ether employed may vary, for instance, from about 10 to 99 per cent of the total weight of the methylol phenyl ether and the aforementioned resins. Generally, I prefer to use from 85 to 98 per cent by weight, of the ether, based on the total weight of the latter and the resin. If desired and where necessary, the methylol phenyl ether and the resin may be dissolved in a suitable solvent in order to blend the material together prior to further processing. The following examples illustrate the use of methylol phenyl ethers in conjunction with the various resins mentioned above. All parts are by weight.

Example XIII

In this example, five parts polyvinyl alcohol, five parts water and five parts 1-allyloxy-2,4,6-tris(hydroxymethyl)benzene were milled on a set of rolls heated at 110 to 130° C. until the water had been removed. The milling characteristics of the mix were satisfactory and a molded piece showed suitable toughness.

Example XIV

Five parts polyvinyl alcohol, five parts water and five parts 1-(2-hydroxyethyloxy)-2,4,6-tris-(hydroxymethyl)benzene were milled on a set of heated rolls until the water had evaporated. The mixture of resin and plasticizer milled readily. A molded piece displayed fair flexibility.

Example XV

Ten parts polyvinyl butyral, five parts 1-benzyloxy - 2,4,6 - tris(hydroxymethyl)benzene and eight parts acetone were mixed and allowed to stand for about five minutes. The mix was then milled on a set of heated rolls, a homogeneous mass being formed very readily. A sheet made from the mix was quite stiff while a piece molded from the material was very hard. These compounds are, therefore, useful for plasticizing resins during molding but yielding rigid molded pieces.

The ethers of the 2,4,6-tris(hydroxymethyl)-phenols may be compounded with fillers and used as casting resins.

While ethers of 2,4,6 - tris(hydroxymethyl) - phenols have been found to be very useful as plasticizers for various resins, they are rather expensive to produce in the pure state because of the separation process. It has been found that for many applications the ethers of the tris-(hydroxymethyl)phenols can tolerate certain amounts of the ethers of 2-(hydroxymethyl)phenol, 4-(hydroxymethyl)phenol, 2,6-bis(hydroxymethyl)phenol and 2,4-bis(hydroxymethyl)phenol. It has been further found that the presence of the ethers of the uni- and bis-compounds does not detract appreciably from the beneficial results obtained so long as the ether of the tris-compound is present in the major proportion of more than fifty per cent by weight. In general, if at least 2.5 mols of formaldehyde are used to each mol of phenol, the major proportion of the reaction product will be the tris(hydroxymethyl) compound. Consequently, the corresponding ether mixture will predominate in the ether of the tris(hydroxymethyl)phenol. The formula of such mixtures may be represented as follows:

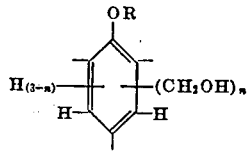

where R represents a member of the class consisting of aliphatic, cycloaliphatic, and aryl-substituted aliphatic groups including their halogen-substituted derivatives, and $n$ is an integer and is at least one but not more than three, and in which the compound in which $n$ is equal to three is in the major proportion. It will, however, be apparent to those skilled in the art that the invention includes the use of mixtures of the methylol phenyl ethers where the trimethylol phenyl ether is less than 50 per cent of the total mixture, e. g., from 10 to 40%, and as high as 90 per cent or more of the weight of methylol phenyl ethers.

Examples illustrating the production of such mixtures of methylol phenyl ethers are as follows where all parts are by weight.

Example XVI

Formalin in the amount of 980 parts (12 mols) of a 37.5% solution of formaldehyde was added to 376 parts phenol and mixed thoroughly. A solution of 176 parts sodium hydroxide in 200 parts water was added slowly to the mixture with cooling. The reaction mixture was then placed in an oven at 40° C. for fifteen to twenty hours. Analysis showed that 95.6 per cent of the formaldehyde had reacted. The above phenate solution was placed in a flask equipped with a stirrer. To the solution was added 326.5 parts allyl chloride and the whole stirred vigorously and heated at 60° C. for about two hours. The etherification reaction ran to about ninety-five per cent of completion.

Example XVII

Three hundred and fifty parts phenol and 900 parts of a 37.3% aqueous formaldehyde were mixed with stirring. To the solution was added 164 parts sodium hydroxide in 170 parts water and the whole reacted for six and one-half hours at 40° C. Analysis showed that 86.6 per cent of the formaldehyde had reacted to give about sixty per cent sodium tris(hydroxymethyl)phenate along with the uni- and bis(hydroxymethyl)-phenates. Three hundred and three parts allyl chloride was added and the mixture reacted in a pressure reactor at 60° C. for three hours with vigorous stirring. Analysis showed that 98.7 per cent of the allyl chloride reacted. The aqueous layer was drawn off and the organic layer dehydrated by heating under a vacuum. The yield was 650 parts of the allyl ethers of the mixed uni-, bis- and tris(hydroxymethyl)phenols with the tris compound being present as the major component.

Example XVIII

Three hundred and thirty-two parts phenol (96% pure) and 835 parts of a 36.4% aqueous solution of formaldehyde and 160 parts sodium hydroxide in 167 parts water were mixed and reacted for seven and one-half hours at 40° C. at which time 83.5 per cent of the formaldehyde had reacted to give a major proportion of sodium tris(hydroxymethyl)phenate as the product. Allyl chloride in the amount of 273 parts was added and the whole mass heated to 60° C. in an air tight reactor for three and one-half hours with vigorous stirring. At the end of this period 93.1 per cent of the allyl chloride had reacted. The isolated organic layer was dehydrated to yield 625 parts of the allyl ether of mixed uni-, bis-, and tris(hydroxymethyl)-phenol with the tris compound as the major component as a brown somewhat viscous oil.

The scope of the useful application of the mixtures of ethers described herein may be more fully appreciated from a consideration of the following examples:

Example XIX

Ninety-five parts by weight of an allyloxy-(hydroxymethyl)benzene, having a hydroxyl content of 22% as against a theoretical 22.6% for the pure tris(hydroxymethyl) compound, showing that the tris compound was the major component, was mixed with five parts by weight of polyvinyl butyral, 130 parts by weight n-butanol, fifteen parts by weight toluene and one part by weight of 85% phosphoric acid. To this mixture was added twenty parts by weight of varnish grade aluminum flake. A test panel of 22 gauge steel which had been bonderized, was sprayed with the above varnish and the coating cured for thirty minutes at 150° C. The panel was partially immersed in a 1½% solution of a household washing powder at 165° F. Minor blistering occurred only after 495 hours of exposure. A typical alkyd varnish similarly tested failed in from two to three hours and an alkali-resistant alkyd varnish in twenty-four hours. A melamine-modified alkyd failed in seventy-two hours.

*Example XX*

Fifty parts by weight of allyloxy(hydroxymethyl)benzene having the same hydroxyl content as that in the preceding example was mixed with five parts by weight of polyvinyl formal resin, twenty-five parts by weight furfural, twenty parts by weight isopropanol and five parts by weight diacetone alcohol. This solution was used as a multiple coating for sand blasted steel test pieces. The six ply multiple coating was cured fifteen minutes between coats and finally for sixteen hours at 180° C. at the end of this time the test pieces had excellent gloss and hardness and were tan to brown in color. The coatings were resistant to alcohols, amines, hydrocarbon solvents, gasoline, ketones, aldehydes, nitro compounds, chlorinated hydrocarbons, inorganic salt solutions, sodium phenate, phenol and sodium hydroxide. A test piece coated as above withstood a fifty per cent sodium hydroxide solution for 140 days at room temperature with only slight discoloration, and sixteen per cent sodium hydroxide at 90°-95° C. for seventy-six days without visible effect. A similar coating prepared from a standard phenolic resin had completely disintegrated after nineteen hours in sixteen per cent caustic solution at 90°-95° C.

Ethers of the hydroxymethylphenols described herein may also be used to advantage in the coating of electrical wiring. For example, a solution of one and one-half to two parts by weight of polyvinyl formal was mixed with about one part by weight of the mixed allyloxy(hydroxymethyl)benzene with a total of about eighteen per cent solids content. Wire coated with this material was equivalent in electrical insulating qualities to that coated with two parts of polyvinyl formal resin and one part cresylic resin.

Fillers such as TiO₂, ferric oxide, zinc oxide, carbon black, aluminum flake or powder, etc. may be used in varying proportions without departing from the scope of the invention.

The use of the above described methylol phenyl ethers with the particular resins mentioned previously is believed to be unique for several reasons. It is one of the very few instances known wherein the methylol phenyl ether used with either the polyvinyl alcohol or polyvinyl acetal is monomeric in nature. Because of the monomeric characteristics of the methylol phenyl ethers, it is possible to obtain a better compatibility with resins than is possible by the use of etherified resinous condensation products of phenol and formaldehyde. In addition, the methylol phenyl ethers appear to be more readily soluble and dissolve more rapidly in a greater variety of solvents than etherified condensed materials. Moreover, the compositions herein claimed wherein the ether is a major component, e. g., above 90 per cent and preferably above 95 per cent, can be applied with spraying apparatus from solutions having much higher solids content than is possible with etherified phenolic resins. This permits substantial savings in the use of solvents and recovery thereof. Finally, the methylol phenyl ethers have excellent shelf life, i. e., they can be stored for long periods of time at normal temperatures without danger of change in the constitution of the material due, for example, to condensation or polymerization of any reactive groups. The presence of the ether group aids substantially in maintaining the shelf life of the methylol phenyl ethers. However, the stability of the material at normal temperatures does not harm its ability to condense rapidly when it is desired to do so by the application of higher temperatures, for example, from 75° to 250° C.

What I claim as new and desire to secure by Letters Patent of the United States is:

1. A composition of matter comprising (1) a resinous material selected from the class consisting of polyvinyl alcohol and polyvinyl acetals, and (2) a compound corresponding to the general formula

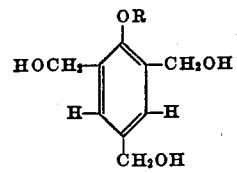

where R represents a member of the class consisting of aliphatic, cycloaliphatic, aryl-substituted aliphatic hydrocarbon groups, and halogen-substituted derivatives of said aliphatic groups.

2. The heat-hardened product of claim 1.

3. A composition of matter comprising (1) a resinous material selected from the class consisting of polyvinyl alcohol and polyvinyl acetals, and (2) a mixture of ingredients comprising (a) a compound represented by general formula

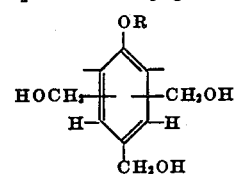

where R represents a member of the class consisting of aliphatic, cycloaliphatic, aryl-substituted aliphatic hydrocarbon groups, and halogen-substituted derivatives of said aliphatic groups, and (b) a compound corresponding to a general formula

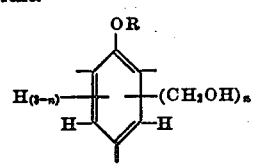

where *n* is one of the following: 1, 2, and R has the meaning given above.

4. The heat-hardened product of claim 3.

5. A composition of matter comprising (a) polyvinyl alcohol and (b) 1-allyloxy-2,4,6-tris-(hydroxymethyl)benzene.

6. The heat-hardened product of claim 5.

7. A composition of matter comprising (a)

polyvinyl butyral resin and (b) 1-allyloxy-2,4,6-tris(hydroxymethyl)benzene.

8. The heat-hardened product of claim 7.

9. A composition of matter comprising (a) polyvinyl alcohol and (b) 1-benzyloxy-2,4,6-tris(hydroxymethyl)benzene.

10. The heat-hardened product of claim 9.

11. A composition of matter comprising (a) polyvinyl butyral resin and (b) 1-benzyloxy-2,4,6-tris(hydroxymethyl)benzene.

12. The heat-hardened product of claim 11.

13. A composition of matter comprising (a) polyvinyl formal resin and (b) 1-benzyloxy-2,4,6-tris(hydroxymethyl)benzene.

14. The heat-hardened product of claim 13.

15. A composition of matter comprising (1) polyvinyl butyral resin and (2) a mixture of ingredients comprising (a) 1-allyloxy-2,4,6-tris-(hydroxymethyl)benzene, and (b) a 1-allyloxy-(hydroxymethyl)benzene wherein the benzene nucleus contains from 1 to 2 hydroxymethyl groups.

16. The heat-hardened product of claim 15.

ROBERT W. MARTIN.

No references cited.